United States Patent Office 3,743,723
Patented July 3, 1973

3,743,723
DISEASE CONTROL COMPOSITION FOR SILK-
WORMS EMPLOYING CERTAIN NAPH-
THYRIDINE COMPOUNDS
Reijiro Kodama, Kyoto-fu, Yugoro Nakasuji, Toyonaka, and Nobuhiro Yamada, Hyogo, Japan, assignors to Takeda Chemical Industries, Ltd., Higashi-ku, Osaka, Japan
No Drawing. Filed June 10, 1970, Ser. No. 45,207
Claims priority, application Japan, June 11, 1969, 44/45,998
Int. Cl. A61k 21/00, 27/00
U.S. Cl. 424—120                    10 Claims

ABSTRACT OF THE DISCLOSURE

A disease control composition for silkworms containing a naphthyridine compound of the formula:

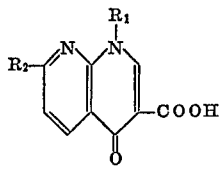

wherein each of $R_1$ and $R_2$ is lower alkyl and salts or esters thereof, which composition shows remarkable control of the flecherie of silkworms caused by the infectious flacherie virus and/or the nuclear-polyhedrosis virus. The aforementioned compound is especially effective when used with other anti-flacherie agents, such as macrolide antibiotics, glucosamine, etc.

---

This invention relates to a disease control composition for silkworms.

Silkworm diseases are serious threats to sericulture, and flacherie, in particular, has been playing great havoc.

It has been known that flacherie of silkworms is caused by bacteria and/or viruses. Against bacteria causing the flacherie, macrolide antibiotices have been known as effective, but no suitable drug for controlling the flacherie due to viruses has been found. Under the circumstances, there has been do direct control measure against flacherie of silkworms, but only some indirect measures such as disinfection of the rearing room and rearing equipment have been practically employed.

Therefore, it has been a cherished desire to have a direct and effective control method for the prevention of viral flacherie.

It has been found by the present inventors that a naphthyridine compound represented by the general formula:

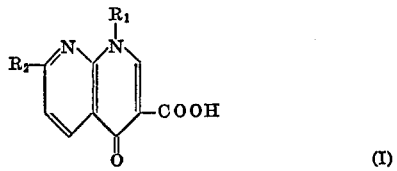

wherein each of $R_1$ and $R_2$ is lower alkyl, shows a remarkable control effect against the flacherie of silkworms, caused by especially the infectious flacherie virus and/or nuclear-polyhedrosis virus. Further, it has been found that, when the compound of the Formula I is used together with other anti-flacherie agents (e.g. macrolide antibiotics, glucosamine, triphenylmethane pigments, acridine pigments, etc.), a synergistic or additive effect is observed.

The present inventors have further found that the compound of the Formula I shows a relatively low toxicity to silkworms.

A principal object of the present invention is to provide a composition for controlling flacherie especially caused by virus, which contains a naphthyridine derivative representable by the Formula I.

Another object of the present invention is to provide a control composition for flacherie of silkworms, which contains a Compound I and other anti-flacherie agents.

As the compounds of Formula I employed in the present invention, there are exemplified, 1-methyl-7-methyl-4-oxo-1,8-naphthyridine-3-carboxylic acid and 1-ethyl - 7 - methyl - 4 - oxo-1,8-naphthyridine-3-carboxylic acid, etc. and salts of these compounds with alkali metal, alkaline earth metal (e.g. sodium, potassium, magnesium, calcium, etc.) or esters thereof with alcohols (e.g. methanol, ethanol, etc.) may also be employed so long as they are harmless to silkworms.

According to the present invention, one or more of the compounds representable by the general Formula I are fed to silkworms in a form of composition or of feed additives. The silkworm-feed as mentioned above contains a Compound I and basal components of an artificial feedstuff for silkworms. The amount of the Compound I to be added is about 0.0003 to 0.07%, more advantageously about 0.001 to 0.05%, relative to the artificial feedstuff (wet basis), though these amounts may vary, for example, with the kinds of the feedstuff for the silkworms or the procedure and conditions for preparing the feedstuff.

Artificial feedstuff for silkworms, in which the Compound I is not incorporated is disclosed in, for example, French Pats. No. 1,392,752, No. 1,392,707, No. 1,394,330 and No. 1,468,486, United States Pats. No. 3,275,446 and No. 3,230,930, etc.

That is to say, such feedstuff contains such components as mulberry leaf powder, the biting factor which stimulates silkworms to bite, (e.g. β-sitosterol with or without flavonoids such as quercetin, morin, rutin, isoquercitrin), the swallowing factor which stimulates them to bite and swallow continuously (e.g. cellulose powder), polyhydroxycarboxylic acid or its derivatives (e.g. chlorogenic acid, caffeic acid, gallic acid, gentisic acid, homogentisic acid, resorcyclic acid, quinic acid, uronic acid, protocatechuic acid, etc.); hydroxybenzaldehyde (e.g. protocatechualdehyde, 3,4,5 - trihydroxybenzaldehyde, 2,3 - dihydroxybenzaldehyde, 2,4 - dihydroxybenzaldehyde, 4 - hydroxybenzaldehyde, 2,4,6-trihydroxybenzaldehyde, etc.), chloine and its derivatives, nucleic acid or its derivatives, sugar, inorganic phosphate, inorganic silicate, inositol, etc.

As components of such artificial feedstuff, which are helpful for the growth of silkworms, there can be used, for example, agar-agar, sodium carboxymethylcellulose, methylcellulose, alginic acid; soybean powder, parched soybean flour, defatted soybean powder, bean curd, dried fermented soybean powder, defatted and dried bean paste; cereal flour such as rice flour, barley flour, wheat flour, etc.; yeast products such as dry yeast, yeast extract, extracted fluid of yeast, extracted yeast cake; straw ashes; fish meal, animal or plant proteins; amino acids or their salts; vitamins (e.g. pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, α-lipoic acid, etc.); inorganic salts (e.g. calcium carbonate, sodium carbonate, sodium hydrogen carbonate, sodium chloride); honey or its processed goods; pectin; cellulose; enzymes (e.g. protease, amylase, pectinase, cellulase, lipase); dihydrostreptomycin; chloramphenicol; sulfa drugs, furan derivatives; glucuronic acid or its salt, amine, or ester, carbohydrate (e.g. soluble starch, starch, glucose, fructose, and the attracting factor which attracts silkworms (terpenes such as citral, linalyl acetate, linalol, terpinyl acetate). Components of these silkworm feedstuff are kneaded with water, steamed, made in a proper form and then fed to silkworms.

Besides, the Compound I can be fed to silkworms in the form of their feedstuff-additives which is used together with mulberry leaves or an artificial feedstuff. These additives consist of Compound I and, if necessary, one or more carriers which are selected from water, the components of the artificial feedstuff mentioned above and the artificial feedstuff itself, and are used in the form of plates, rods, flakes, granules, powder, wettable powder, solution, emulsion, etc. The concentration of Compound I in said additives, advantageously falls in the range of 0.001–0.05%. The additive can, for instance, be prepared by kneading the Compound I with an artificial feedstuff which is used as a carrier, in such a proportion as about 3 to 70,000γ per gram of the carrier (dry basis). Or, the additive may be a liquid preparation, e.g. an aqueous solution containing about 3 to 70,000γ/ml. of the Compound I.

A preferable form of the additive may be a mixture of the Compound I and soluble carrier. The mixture is dissolved in water and the solution is coated on the mulberry leaves by dipping the leaves in the solution, admixed with artificial feedstuff, or sprayed on the mulberry leaves or artificial feedstuff. And, when the additive prepared in the foregoing manner is added to an artificial feedstuff or mulberry leaves, for example, it is recommended to arrange so that every 900 square centimeters of the rearing area may contain in even distribution about 2 to 3 grams of the additive.

The disease controlling composition of the present invention may contain further anti-microbial or anti-viral components, e.g. one or more of antibiotics, acridine pigments, triphenylmethane pigments, or glucosamine derivatives, etc.

Macrolide antibiotics, i.e. those containing a multi-membered lactone moiety and an amino-sugar moiety in the molecule, are preferable as the antibiotics and exemplified by oleandomycin, tyrocidin, leucomycin, erythromycin, pikromycin, triacetyloleandomycin, carbomycin, spiramycin, tylosin, tertiomycin, etc. Besides, other antibiotics such as neomycin, chloramphenicol, dihydrostrepomycin, kanamycin, etc. may also be incorporated in the composition of the present invention for combating bacterial damage against silkworms. The amount of said antibiotic to be added to the present compositions is about 0.00005 to about 0.05% and more advantageously, about 0.0001 to about 0.01%.

As the glucosamine derivatives, being active as antiviral agent, there are exemplified by fructosazine, hemifructosazine, N-acetylglucosamine, pyrazine-monocarbonic acid, pyrazine-N-oxide, etc. The amount of said glucosamine derivative to be used is about 0.01 to about 5.0%, more advantageously, about 0.05 to about 1%.

As triphenylmethane pigment employable in the present invention for combating viral infection of silkworms, there are exemplified, malachite green, crystal violet, methyl violet, gentian violet, brilliant green, etc. as well as their salts, such as the hydrochlorides, sulfates, oxalates, zinc double salts and the like. The amount of the triphenylmethane pigment to be added to the present compositions, is about 0.00002 to 0.02%, more advantageously, about 0.0001 to 0.005%, relative to the artificial feedstuff (wet basis) or mulberry leaves.

As the acridine pigment employable in the present invention for combating viral infection of silkworms, there are exemplified, acridine orange, acridine yellow, acridine red, acridine, acrinol, acriflavine, etc. as well as their salts, such as the sulfates, acetates and the like. The amount of acridine pigment to be added to the present compositions, is about 0.00002 to 0.1%, more advantageously, about 0.0001 to 0.01% relative to the artificial feedstuff (wet basis) or mulberry leaves.

The macrolide antibiotics are found, when used with the Compound I in combination, to show a remarkable synergistic effect to the diseases of silkworms, especially to flacherie. The mechanism of such synergistic effect may be as follows:

The present inventors did considerable work to elucidate the pathopoietic process of flacherie using certain pathogenic viruses and bacteria, in which work they first studied the pathopoietic process by administering a viral suspension of a scarcely pathogenic order and very weakly pathogenic bacterial strains, either independently or in combination, to silkworm larvae that have been raised on artificial feedstuff under germ-free conditions. This preliminary study resulted in the finding that if the larvae are fed for 24 hours with a foodstuff inoculated with a virus in their third or fourth instar and, then, are fed for 4 hours in their fifth instar with a foodstuff inoculated with G–27 strain (an intermediate between *Streptococcus faecalis* and *Streptococcus faecium*) or with the virus and bacterial strain concurrently in their fifth instar, there is a synergistic effect which accounts for a high incidence of flacherie. It was thus confirmed, for the first time, that the viral and bacterial agents cooperate with each other to cause flacherie. Thus, it can be said that a combination of the compound which can control the flacherie virus and macrolide antibiotics which can control the flacherie bacteria shows a synergistic effect. Meanwhile, among the pathogens responsible for viral flacherie, there are nuclear-polyhydrosis viruses (hereinafter referred to as "NV"), flacherie viruses (hereinafter referred to as "FV") and cytoplasmic polyhydral viruses (hereinafter referred to as "CPV"). The Compound I is effective especially against viruses NV and FV, and triphenylmethane pigment, acridine pigment are very effective against CPV. The glucosamine derivatives mentioned above, on the other hand, can be effective against any kind of flacherie caused by viruses, though not satisfactorily and cooperate with the Compound I and/or macrolide antibiotics. This is confirmed by the following tests. The basic feedstuff employed in these tests contains components listed below:

| | | |
|---|---|---|
| Mulberry leaf powder | g | 2.0 |
| Cellulose powder | g | 3.5 |
| Defatted soybean powder | g | 1.5 |
| Cane sugar | g | 1.0 |
| Starch | g | 1.5 |
| Wesson's minerals [1] | g | 0.15 |
| Vitamin mixture [2] | g | 0.04 |
| β-Cistosterol | g | 0.05 |
| Vitamin C | g | 0.05 |
| Inositol | g | 0.05 |
| $K_2HPO_4$ | g | 0.05 |
| Acetylcholine | g | 0.01 |
| Water | ml | 16 |
| (1st-3rd-instar) | ml | 16 |
| (1st-4th-instar) | ml | 15 |
| (1st-5th-instar) | ml | 14 |

[1] Consisting of NaCl, KCl, $KH_2PO_4$, $Ca_3(PO_4)_2$, $(CaCO_3$, $FePO_4$, $MgSO_4 \cdot 7H_2O$, $KAl_2(SO_4)_3 \cdot 12H_2O$, $CuSO_4 \cdot 5H_2O$, $MnSO_4$ and KI in the weight ratio of 52.5 : 60.0 : 15.5 : 74.5 : 10.5 : 7.4 : 45.0 : 0.05 0.2 : 0.1 : 0.03.
[2] Consisting of vitamin $B_1 \cdot HCl$, vitamin $B_2$, vitamin $B_6$, nicotinic acid, calcium pantothenate, folic acid, biotin, and vitamin Bt in the weight ratio of 10 : 10 : 10 : 20 : 20 : 2 : 2 : 10.

TEST I

(I) Rearing

The silkworms are reared by the basal diet mentioned above under germ-free conditions. The amount of the feedstuff and the spreading area are decided as shown in the following table:

| Instar | First | Second | Third | Fourth | Fifth |
|---|---|---|---|---|---|
| Amount of feedstuff in dry weight per one silkworm (g.) | 0.01 | 0.05 | 0.3 | 0.5 | 4 |
| Area per one silkworm (cm.$^2$) | 0.3 | 0.8 | 2.1 | 5.5 | 21.0 |

(II) Infection of virus

FV: A homogenate of the infectious flacherie silkworms is used as the origin of the infectious flacherie virus. The homogenate is diluted to $10^{-4}$ with water and 0.3 ml. of the diluted homogenate is coated on 5 grams of artificial feedstuff. The coated feedstuff is fed to larvae for 24 hours at 2nd day of the third instar.

NV: A body fluid of the infectious flacherie silkworms is used as the origin of the infectious nuclear-polyhedrosis virus. The homogenate is diluted to $10^8$ polyhedra/ml. with water and 0.3 ml. of the diluted homogenate is coated on 5 grams of artificial feedstuff. The coated feedstuff is fed to larvae for 24 hours at 2nd day of the third instar.

(III) Feeding of drug 1-ethyl-7-methyl-4-oxo-1,8-naphthyridine-3-carboxylic acid (hereinafter referred to as "NDA") is evenly added to the artificial feedstuff in the ratio of $10\gamma$ or $100\gamma$ to 1 g. of the feedstuff. The feedstuff is fed to larvae in the third, fourth and fifth instars, except 2nd day of third instar.

(IV) Results

TABLE I

| | Infected virus | Content of NDA ($\gamma$/1 g. of prepared diet) | Number of test larvae | Number of dead larvae until pupal stage | Mortality ratio, percent |
|---|---|---|---|---|---|
| Number: | | | | | |
| 1 | FV | | 20 | 15 | 75 |
| 2 | FV | 10 | 20 | 8 | 40 |
| 3 | FV | 100 | 20 | 0 | 0 |
| 4 | NV | | 20 | 13 | 65 |
| 5 | NV | 10 | 20 | 7 | 35 |
| 6 | NV | 100 | 20 | 0 | 0 |
| Control, not treated | | | 20 | 0 | 0 |

TEST II (I) Rearing

As per Test I.

(II) Infection of virus and bacteria (1) FV: As per Test I.

(2) An intermediate between *Streptococcus faecalis* and *Streptococcus faecium* (hereinafter referred to as "G-27"):

A culture suspension containing $1.6 \times 10^3$ cells/0.2 ml. of the strain is coated on 5 g. of prepared feedstuff. The coated feedstuff is fed to larvae for the first 4 hours at 2nd day of the fifth inster. (Test Nos. 2 to 6).

(III) Feeding of drug (1) Fructosazine (hereinafter referred to as "FS") is evenly admixed with the artificial feedstuff in the ratio of 2 mg. to 1 g. The feedstuff is fed to larvae of the third, fourth and fifth instar at test Nos. 7 to 10, except for the 2nd day of third instar.

(2) NDA is evenly admixed with the artificial feedstuff in the ratio of $10-100\gamma$ is 1 g. of the feedstuff. The feedstuff containing NDA is fed to larvae of the third, fourth and fifth instars in test Nos. 4 and 6 except for the 2nd day of the third instar and the first 4 hours of the 2nd day of the fifth instar and in tests Nos. 8 to 10 except for the 2nd day of the third instar.

(3) Leucomycin (hereinafter referred to as "LM") is evenly admixed with the artificial feedstuff in the ratio of $10\gamma$ to 1 g. of the feedstuff. In the test Nos. 5 and 6, the feedstuff is fed to larvae of fifth instar, except the first 4th hours at 2nd day of fifth instar.

(IV) Results

TABLE II

| | Infected virus | Infected bacteria | Name and content of the effective elements | Number of test larvae | Number of dead larvae until pupal stage | Mortality ratio, percent |
|---|---|---|---|---|---|---|
| Number: | | | | | | |
| 1 | FV ($10^{-5}$) | | | 10 | 1 | 10 |
| 2 | | G-27 ($1.6 \times 10^3$) | | 10 | 2 | 20 |
| 3 | FV ($10^{-5}$) | G-27 ($1.6 \times 10^3$) | | 10 | 8 | 80 |
| 4 | FV ($10^{-5}$) | G-27 ($1.6 \times 10^3$) | 3d to 5th instar, NDA ($100\gamma$) | 10 | 5 | 50 |
| 5 | FV ($10^{-5}$) | G-27 ($1.6 \times 10^3$) | 5th instar LM ($10\gamma$) | 10 | 2 | 20 |
| 6 | FV ($10^{-5}$) | G-27 ($1.6 \times 10^3$) | 3d to 5th instar NCA ($100\gamma$), 5th instar LM ($10\gamma$) | 10 | 0 | 0 |
| 7 | FV ($10^{-5}$) | | 3d to 5th instar FS (2 mg.) | 10 | 4 | 40 |
| 8 | FV ($10^{-5}$) | | 3d to 5th instar FS (2 mg.) plus NDA ($10\gamma$) | 10 | 2 | 20 |
| 9 | FV ($10^{-5}$) | | 3d to 5th instar FS (2 mg.) plus NDA ($25\gamma$) | 10 | 0 | 0 |
| 10 | FV ($10^{-5}$) | | 3d to 5th instar FS (2 mg.) plus NDA ($50\gamma$) | 10 | 0 | 0 |
| Not treated | | | | 10 | 0 | 0 |

TEST III (I) Rearing

The silkworms are reared with mulberry leaves during the 1st and 2nd instar.

(II) Infection of virus

NV: A suspension containing $1.35 \times 10^7$ polyhedra of the infectious nuclear-polyhedrosis virus in 1 ml. is used as the basal suspension. The basal suspension is diluted $10^3$ to $10^7$ times with water. Each diluted suspension is indicated as $10^{-3}$ to $10^{-7}$, respectively. The mulberry leaves are soaked in each diluted polyhedra suspension and dried in the shade. The mulberry leaves are fed to larvae of the secondary of the third instar for 24 hours.

(III) Feeding of drugs 50 mg. of leucomycin, 70 mg. of neomycin, 30 mg. malachite green and 500 mg. of NDA is dissolved in 2 liters of water. The mulberry leaves are dipped out in the solution and dried in the shade. The mulberry leaves are fed to larvae infected with virus in the above (II), namely, from the 3rd day of the third instar to the end of the fifth instar.

Control is fed with mulberry leaves treated with water in stead of the above drug solution.

(IV) Result

| Concentration of the basal virus solution | Test larvae in heads | Dead larvae until pupal stage (percent) | |
|---|---|---|---|
| | | Control | Mixed drug |
| 10⁻³ | 30 | 93.3 | 76.7 |
| 10⁻⁴ | 30 | 63.3 | 46.7 |
| 10⁻⁵ | 30 | 30.0 | 10.0 |
| 10⁻⁶ | 30 | 20.0 | 10.0 |
| 10⁻⁷ | 30 | 15.0 | 0 |

TEST IV

(I) Rearing

The silkworms are reared with mulberry leaves during 1st and 2nd instar.

(II) Infection of virus

FV: A homogenate of the infectious flacherie silkworms is used as the origin of the flacherie virus. The homogenate is diluted $10^5$–$10^9$ with water and each diluted solution is indicated as $10^{-5}$ to $10^{-9}$. The mulberry leaves are dipped out in the each diluted homogenate and dried in the shade. The mulberry leaves are fed to larvae of the second day of the third instar for 24 hours.

(III) Feeding of drugs 50 mg. of leucomycin, 70 mg. of neomycin, 30 mg. malachite green and 500 mg. of NDA is dissolved in 2 liters of water. The mulberry leaves are dipped out in the solution and dried in the shade. The mulberry leaves are fed to larvae infected with virus in the above (II), namely, from the 3rd day of the third instar to the end of the fifth instar.

Control is fed mulberry leaves treated with water instead of the above drug solution.

(IV) Result

| Concentration of the basal virus solution | Number of test larvae | Dead larvae until pupal stage (percent) | |
|---|---|---|---|
| | | Control | Mixed drug |
| 10⁻⁵ | 30 | 100 | 100 |
| 10⁻⁶ | 30 | 100 | 63 |
| 10⁻⁷ | 30 | 100 | 34 |
| 10⁻⁸ | 30 | 54 | 8 |
| 10⁻⁹ | 30 | 40 | 7.5 |

TEST V

(I) Rearing

The silkworms are reared with the mulberry leaves during 1st and 2nd instar.

(II) Infection of virus

CPV: Mulberry leaves are dipped out in the solution containing $10^5$ to $10^8$ polyhedra/ml. of the infections cytoplasmic-polyhedral virus and dried in the shade. The mulberry leaves are fed to larvae on the second day of the third instar for 24 hours.

(III) Feeding of drugs 50 mg. of leucomycin, 20 mg. of neomycin, 30 mg. malachite green and 500 mg. of NDA is dissolved in 2 liters of water. The mulberry leaves are dipped out in the solution and dried in the shade. The mulberry leaves are fed to larvae infected with virus in the above (II), namely, from the 3rd day of the third instar at the end of fifth instar.

A control is fed mulberry leaves treated with water instead of the above drug solution.

(IV) Result

| Number of polyhedra of CPV/ml. | Test larvae in head | Dead larvae until pupal stage (percent) | |
|---|---|---|---|
| | | Control | Mixed drug |
| 10⁵ | 50 | 76 | 40 |
| 10⁷ | 50 | 56 | 16 |
| 10⁶ | 50 | 30 | 2 |
| 10⁵ | 50 | 6 | 0 |

The following examples show presently preferred embodiments of this invention but are not to be construed as restrictive. It is to be understood that the following examples are solely for the purpose of illustration and not for limitation of this invention, and that variations may be resorted to without departing from the spirit and scope of this invention. In the example, parts by weight bear the same relation to parts by volume as do grams to milliliters.

EXAMPLE 1

A silkworm feed-additive is prepared by admixing 0.05 part by weight of 1-ethyl-7-methyl-4-oxo-1,8-naphthyridine-3-carboxylic acid with 10 parts by weight of soluble starch.

The mixture (1 weight part) is dissolved in water (100 volume parts) and the solution is sprayed on the mulberry leaves.

EXAMPLE 2

A mixture of two-hundred parts by weight of mulberry leaf powder, 150 parts by weight of defatted soybean powder, 35 parts by weight of cellulose powder, 0.5 part by weight of β-sitosterol, 0.4 part by weight of vitamin mixture, 1 part by weight of Wesson's minerals, 0.5 part by weight of inositol, 0.5 part by weight of potassium monohydrogen phosphate and 0.05 part by weight of choline chloride is used as a basic mixture of artificial feedstuff for silkworms. A solution of 3 weight parts of 1 ethyl-7-methyl-4-oxo-1,8-naphthyridine-3-carboxylic acid, and 2000 weight parts of water is admixed with 10,000 weight parts of the above basic mixture.

The thus-obtained mixture may be fed as a silkworm disease control feedstuff.

EXAMPLE 3

Thirty weight parts of 1-ethyl-7-methyl-4-oxo-1,8-naphthyridine-3-carboxylic acid, 3 weight parts of leucomycin and 600 weight parts of fructosazine are suspended in 2000 volume parts of water and the suspension is admixed with 200,000 weight parts of the basic mixture of Example 2.

The thus-obtained mixture may be used as a silkworm disease control feedstuff.

EXAMPLE 4

Fifty parts by weight of leucomycin, 70 parts by weight of neomycin, 30 parts by weight of malachite green and 500 parts by weight 1-ethyl-7-methyl-4-oxo-1,8-naphthyridine-3-carboxylic acid are dissolved in 2 liters of water. The mulberry leaves are dipped out in the solution and dried in the shade.

Thus-obtained mulberry leaves may be used as a silkworm disease control feedstuff.

EXAMPLE 5

A silkworm disease control agent is prepared by mixing 10 parts by weight of soluble starch thoroughly with 0.001 part by weight of acridine orange and 0.005 part by weight of 1-ethyl-7-methyl - 4 - oxo-1,8-naphthyridine-3-carboxylic acid. The mixture (1 weight part) is dissolved in water (100 volume parts) and the solution is sprayed on the mulberry leaves.

What is claimed is:

1. A flacherie disease control composition for silkworms, which consists essentially of an artifical silkworm feedstuff and an effective diease controlling amount of a compound represented by the formula

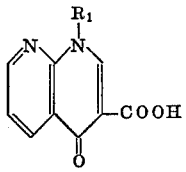

wherein each of $R_1$ and $R_2$ is lower alkyl; its alkali metal salt, alkaline earth metal salt or its ester with methanol or ethanol.

2. A flacherie disease control composition as defined in claim 1 wherein the effective compound is 1-ethyl-7-methyl - 4 - oxo - 1,8 - naphthyridine - 3 - carboxylic acid or a salt or ester thereof as defined in said claim.

3. A flacherie control feedstuff for silkworms according to claim 1, wherein the amount of the effective compound is about 0.003 to about 0.07% by weight.

4. A flacherie disease control feedstuff for silkworms as defined in claim 3 wherein the active compound is 1-ethyl - 7 - methyl - 4 - oxo - 1,8 - naphthyridine-3-carboxylic acid or a salt or ester thereof as defined in said claim.

5. A flacherie disease control feedstuff for silkworms according to claim 3 wherein a macrolide antibiotic selected from the group consisting of oleandomycin, triacetyloleandomycin, tyrocidin, leucomycin, carbomycin, erythromycin, pikromycin, spiramycin, tylosin and tertiomycin is present therein the amount of about 0.00005% to about 0.05% by weight.

6. A flacherie disease control feed-additive for silkworms consisting essentially of a compound represented by the formula

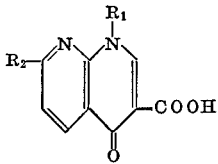

wherein each of $R_1$ and $R_2$ is lower alkyl; its alkali metal salt, alkaline earth metal salt or its ester with methanol or ethanol, and as a carrier thereof, silkworm feedstuff or a component of such feedstuff, said compound being present in an amount of about 0.0003% to about 7% by weight.

7. A flacherie disease control feed-additive as defined in claim 6 wherein the effective compound is 1-ethyl-7-methyl - 4 - oxo - 1,8 - naphthyridine-3-carboxylic acid.

8. A flacherie disease control feed-additive as defined in claim 6 wherein a macrolide antibiotic selected from the group consisting of oleandomycin, triacetyloleandmycin, tyrocidin, leucomycin, carbomycin, erythromycin, pikoromycin, spiramycin, tylosin and tertiomycin is present therein in an amount of about 0.00005% to about 0.05% by weight.

9. A method for controlling the flacherie disease of silkworms which comprises feeding said silkworms a composition consisting essentially of an artificial feedstuff or water and an effective disease controlling amount of a compound represented by the formula

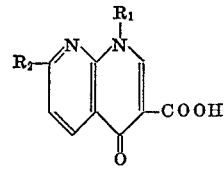

wherein each of $R_1$ and $R_2$ is lower alkyl; its alkali metal salt, alkaline earth metal salt or its ester with methanol or ethanol.

10. A method for controlling the flacherie disease of silkworms which comprises feeding said silkworms a composition consisting essentially of an effective disease controlling amount of a compound represented by the formula

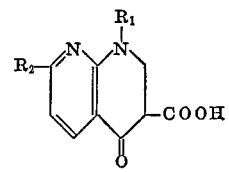

wherein each of $R_1$ and $R_2$ is lower alkyl; its alkali metal salt, alkaline earth metal salt or its ester with methanol or ethanol, said compound being present in an amount of about 0.0003% to about 7% by weight, a macrolide antibiotic selected from the group consisting of oleandomycin, triacetyloleandmycin, tyrocidin, leucomycin, carbomycin, pikromycin, spiramycin, tylosin and tertiomycin, said antibiotic being present in an amount of about 0.00005% to about 0.05%, and as a carrier, silkworm feedstuff; a component of such feedstuff or water.

References Cited
UNITED STATES PATENTS
3,565,989    2/1971    Kodama et al. _____ 424—181
3,429,887    2/1969    Lesher _____ 424—256

OTHER REFERENCES
Chemical Abstracts, vol. 58 (1963) p. 7954e.

SAM ROSEN, Primary Examiner

V. D. TURNER, Assistant Examiner

U.S. Cl. X.R.

424—177, 181, 256, 283